Nov. 25, 1924.

E. A. BASEL 1,516,945

OIL BURNER VALVE

Filed Dec. 11, 1922

Inventor:—
Eli A. Basel,
By
Thorpe & Gerard,
Attorneys.

Witness:
R. L. Hamilton

Patented Nov. 25, 1924.

1,516,945

UNITED STATES PATENT OFFICE.

ELI A. BASEL, OF KANSAS CITY, MISSOURI.

OIL-BURNER VALVE.

Application filed December 11, 1922. Serial No. 606,100.

*To all whom it may concern:*

Be it known that I, ELI A. BASEL, a citizen of the United States, and resident of Kansas City, county of Jackson, State of Missouri, have invented a certain new and useful Improvement in Oil-Burner Valves, of which the following is a complete specification.

The present invention relates to valves and valve controlling devices, with particular reference to valves of the type especially designed for use with burners using either liquid or gaseous fuel.

One of the main objects in view is to provide a valve of this character with an automatic and adjustable controlling device operating to prevent a too quick or sudden movement of the valve, and particularly to effect a gradual opening movement of the valve. The valve is also provided with a manual controlling device, and both the automatic and manual valve-controlling devices are connectible for operation together or in unison, and also adapted to be disconnected for independent movement. The improved construction further includes adjustable stops for limiting the opening and closing movements of the valve, and in this connection means is also provided for automatic retaining engagement with one of the valve-operating devices, when the valve is closed, for maintaining the same in closed position.

With the foregoing general objects in view, the invention will now be described by reference to the accompanying drawing illustrating one form of construction which I have devised for embodying the invention, after which those features deemed to be novel will be particularly set forth and claimed.

In the drawing—

Figure 1 is a front elevation illustrating a valve structure embodying the present features of improvement;

Figure 2 is a plan view of the same;

Figure 3 is a vertical sectional view taken on the line III—III of Figure 1;

Figure 4 is a section taken on the line IV—IV of Figure 3; and

Figure 5 is an enlarged sectional detail view of the releasable connection between the manual and automatic valve-operating devices.

Referring now to the drawing in detail, this illustrates the proposed features of improvement in connection with a valve structure similar to that described in my copending applications Serial Nos. 528,062 and 599,400, filed January 9, 1922 and November 6, 1922, respectively, this valve structure comprising a substantially spherical form of valve casing split in two sections 6 and 7, embracing between them a diaphragm member 8 of suitable flexible material, such as light sheet metal.

With the casing section 7 is connected a suitable intake pipe 9 for the fuel which is conducted by way of a valve port 10 controlled by a needle valve 11 carried centrally by the diaphragm member 8; from the pipe 9 the fuel is conducted through a chamber 12 (containing a screen 13) past the valve 11 and through the casing section 7 to the outlet pipe 14 leading to the burner (not shown). The valve 11 is so fitted to the diaphragm member 8 as to be maintained by the latter, by cooperation of a spring 15 coiled around the valve 11, normally in open position, as represented in Figure 3; and on the opposite or front face of the diaphragm the stem of said valve is adapted to be engaged by an operating or thrust rod 16, for the suitable regulation of the position of the valve. This rod 16 is mounted in an inwardly projecting bearing portion 17, and the outer portion of the rod is threaded through the hub portion 18 formed on the middle portion of a lever 19, to which hub portion is fitted a sleeve 20 secured in place by a clamping screw 21. The outer end of the rod 16 is engaged by a pressure spring 22 supported by means of a pair of adjusting screws 23 carried by a bracket member 24 attached by a screw 25 to the casing section 6. The pressure of the finger or spring 22 operates to relieve the thrust rod 16 of the counterthrust due to the pressure on the valve side of the diaphragm 8, as hereinafter explained, resulting in a freer operation of the rod 16.

To the outer end of the rod 16 is also secured a manually operable finger or pointer 26 designed to operate as an index around a dial 27 also attached by the screw 25 and a second screw 28 to the casing section 6. Extending diagonally through the finger 26 is a sliding latch pin 29 adapted to be actuated by a spring 30 into engagement with the recess 31 in the outer end of the sleeve 20 (see Figure 5), said pin being also provided with a nut 32 threaded on the outer end thereof for retracting the pin from engagement with said recess, and thereby releasing the finger from its connection with the automatic valve-controlling lever 19. To the sleeve 20 is also secured an index member 33 designed to indicate the position of said recess 30 with relation to the dial 27.

Either end of the lever 19 may be attached to any preferred form of thermostat or temperature regulating system which may be adopted for the automatic control of the valve, Figures 1 and 2 illustrating one end of said lever in sliding engagement with a link 34 connected by a fiber link 35 to a chain 36 leading to the thermostat device (not shown); the link 35 is of insulating material to prevent any passage of electric current from the electric connections of the thermostat system, and the link 34 is provided with a weight 37 designed to carry the chain down free of slack when the thermostat operates to release the lever 19 for opening the valve. This opening movement in the arrangement illustrated is effected by means of a counterweight 38 mounted on that end of the lever 19 to which the chain 36 is attached. Ordinarily, the opening movement of the valve is caused to take place too rapidly, or faster than the oil can be vaporized in the relatively cool condition of the burner, and I therefore provide means for retarding this valve-opening movement in the form of a dash-pot structure comprising a cylinder 40 and plunger 41 carried by a plunger rod 42 connected by a link 43 with that arm of the lever which carries the counterweight 38. The cylinder 40 is attached to the casing section 6 by means of a yoke 44 and attaching screws 25 and 28, and, as usual in such constructions, the cylinder is formed with a bypass passage 45 communicating with opposite ends of the cylinder; at its upper end said passage is fitted with an adjustable screw 46 operating as a valve in conjunction with a port 47 between the passage 45 and the upper end of the cylinder, and thus regulating the retarding effort exerted by the device upon the lever 19. As shown in Figure 3, the plunger 41 carries a valve member 48 adapted to be maintained closed in the downward movement of the plunger, but opening automatically in the upward movement of the plunger to unclose the plunger openings 49 and thus allowing the plunger to move with comparative freedom on its upward stroke. An adjustable stop device is provided for limiting the opening movement of the valve by engagement with the lever 19, this device comprising a stud 50 adjustable along a curved slot 51 provided around one side of the dial 27 and adapted to be clamped in any position along the slot by means of a wing nut 52. The closing movement of the valve is also limited by engagement of the finger 26 with a stop screw 53 adjustably mounted in a lug 54 projecting from the opposite side of the dial 27 (see Figures 1 and 2). To said lug 54 is also attached a curved leaf spring 55 extending in position for friction engagement with the free end of the finger 26 as the latter moves into valve-closing position, and thereby acting to maintain the valve closed.

Pivotally connected, as indicated at 56, to the interior of the casing section 7, is a lever 56 formed with an intermediate opening 57 for enclosing the abutting ends of the valve 11 and rod 16, this portion of said lever 56 being engaged by a coil spring 58 surrounding the bearing portion 17 and tending to actuate said lever in the direction of the diaphragm 8 for forcing the valve 11 into closed position. The lever 56 is maintained normally in retracted position to permit opening of the valve by a pair of toggle links 59 and 60, the latter being pivoted, as at 61, to the lower end of the lever 56, while the other link 59 is pivoted, as at 62, to a lug 63 depending from the casing section 7 (see Figure 3).

An arm 65 is also pivotally mounted in the lug 63 and formed with a terminal hook for supporting engagement with a bucket 66, for the purpose of receiving oil discharging from a pipe 67 connected with the burner, in case the latter should overflow, as in the event of the burner flame becoming extinguished. When the toggle links are in straightened position, as shown in Figure 3, a pin 68 connecting said links and forming the toggle joint, engages the intermediate portion of the arm 65 and slightly raises the same, supporting it and the bucket 66 carried thereby. The straightening action of the toggle links is adjusted and limited by a stop screw 69 carried by the link 59 and adapted to engage the valve casing; by this means, the sensitiveness of the tripping action and release of the lever 56 in response to the weight of the oil overflowing into the bucket 66 may be conveniently varied. After each tripping action, the movement of the bucket is stopped, with the arm 65 out of engagement with the pin 68, by means of an extension 70 from the pivoted end of said arm, which is adapted to engage the valve casing, thus preventing any slopping of the contents of the bucket due to too great movement or sudden stopping thereof, and retaining the bucket in proper receiving relation to the overflow pipe 67.

A signaling means is also provided for operation in response to each tripping action of the bucket. This means comprises conducting wires 72 designed to be included in any suitable alarm circuit, one of these wires being attached to the lug 63 and the other to a plate 73 attached to an insulating block 74 carried by the toggle link 59. The plate 73 is provided with a contact screw 75 adapted, on the breaking of the toggle joint, to be brought into engagement with the lug 63, thereby closing the circuit in an obvious manner and signaling at once to the party in charge of the installation that the burner requires attention.

The foregoing construction provides an efficient valve and controlling means for embodying the features of the invention. In the usual burner installation employing an automatic or thermostatic control, the valve is operated by a quick movement in both its opening and closing directions; after the burner flame has continued at a low stage for any length of time, the burner is cooled off somewhat, so that its condition is not such as to readily convert the full flow of oil into vapor. As a consequence, the combustion will be imperfect, producing a smoky flame with objectionable soot or carbon deposits, and often the flame is extinguished by the sudden inrush of cool oil. This defective burner operation is entirely overcome by the additional dash-pot control feature as applied to the valve-operating lever in the present construction, whereby said lever is prevented from opening the valve too quickly, since the counterweight 38 cannot move the lever 19 any faster than is permitted by the comparatively slow moving plunger of the cylinder 40. This movement may be varied by adjustment of the regulating screw 46, so that the valve will always be opened at the proper slow and uniform rate best adapted for the burner's operation, as explained in my second copending application above referred to. In case the burner should overflow for any reason, the valve will be at once closed automatically by the weight of a given amount of oil overflowing into the bucket 66, as determined by the adjustment of the screw 69. Simultaneously with this tripping operation, the alarm circuit is closed by the contact screw 75 engaging the lug 63, thus signalling the condition of the burner and the fact that the fuel has been cut off therefrom.

By the provision of the pin 29 I am able to connect or disconnect the manual valve-operating finger 26 to and from the sleeve 20 which is secured to the automatic valve-operating lever 19, and this feature, combined with the adjustability of the sleeve 20, brings about advantages of considerable importance. The proper adjustment of the sleeve 20 is obtained while the lever 19 is in the position to which it is turned by the operation of the thermostat for closing the valve to reduce the flow of the oil; in carrying out this adjustment the set screw 21 is loosened and the sleeve 20 engaged with the finger 26 by means of the pin 29, and starting with the finger 26 in valve-closed position, said finger is operated manually to open the valve gradually to the minimum flame condition of the burner. The screw 21 is then tightened, after which it is obvious that the action of the thermostat through the lever 19 will operate the valve back and forth between minimum flame and maximum flame positions, in the usual manner. Therefore, the pointer 33 always indicates the minimum flame position for the valve, or that position to which the thermostat operates the valve to reduce the flow of the oil, and hence that position to which the finger 26 must be turned to connect it with the lever 19 by means of the pin 29. Accordingly, whenever it is necessary to relight the burner, the finger 26 is simply turned to the minimum flame position as indicated by the pointer 33 and thereby connected with the thermostat lever 19, and the thermostat control thereafter regulates entirely the operation of the burner. One of the principal features of advantage attending this releasable connection between the finger 26 and lever 19 is the fact that when the valve is closed by means of the finger 26, the pin 29 is retracted from the recess 31, and hence any action of the thermostat will simply operate the lever idly without any actuation of the valve, the latter being maintained closed by the finger 26 and the spring latch 55; this effectually prevents any strain being placed upon the working parts of the motor of the thermostat in the event of the latter continuing to operate from time to time. Moreover, by holding the pin 29 retracted by means of the nut 32, the valve may be operated entirely by manipulation of the finger 26, to the exclusion of the thermostat control, as may be desired under some conditions. Again, it will be noted that the lever 19 is illustrated as adapted for a thermostat connection at each end, so that the counterweight feature may be omitted and the valve operated automatically by a chain connection to each end of the lever 19, if preferred.

The casing section 7 is provided with a drain cock 76 so that the contents may be drained off at any time and any sediment collecting on the interior of said casing removed.

While I have illustrated and described what is now deemed to constitute the preferred form of embodiment of the invention, I desire to reserve the right to make such changes or modifications as may fairly fall within the scope of the appended claims.

What I claim is:

1. Valve mechanism for burners comprising, in combination with the fuel passage leading to the burner, a valve controlling the flow of fuel through said passage, a manually operable device for controlling said valve, an operating device having a remote-control connection for controlling said valve, each of said controlling devices being operative to actuate the valve into either wholly-open or fully-closed position and also to maintain the valve in various partially-open positions, and a releasable connection between said controlling devices.

2. Valve mechanism for burners comprising in combination with the fuel passage leading to the burner, a valve controlling the flow of fuel through said passage, an operating device having a remote-control connection for controlling said valve, a manual valve-operating device operable to control said valve independently of said first device, and means providing an adjustable and releasable connection between said controlling devices.

3. Valve mechanism for burners comprising, in combination with the fuel passage leading to the burner, a valve controlling the flow of fuel through said passage, a manually operable device for controlling said valve, an operating device having a remote-control connection for controlling said valve and having an adjustable catch element, and a retractable pin carried by said manually operable device for engagement with said catch element.

4. Valve mechanism for burners comprising, in combination with the fuel passage leading to the burner, a valve controlling the flow of fuel through said passage, a manually operable device for controlling said valve, an operating device having a remote-control connection for controlling said valve, each of said controlling devices being operative to actuate the valve into either wholly-open or fully-closed position and also to maintain the valve in various partially-open positions, a releasable connection between said controlling devices, and means acting automatically to engage and retain said manually operable device in valve-closed position.

5. Valve mechanism for burners comprising, in combination with the fuel passage leading to the burner, a valve controlling the flow of fuel through said passage, a manually operable device for controlling said valve, an operating device having a remote-control connection for controlling said valve, a releasable connection between said controlling devices, and an adjustable stop for limiting the valve-opening movement of said remote-control operating device.

6. Valve mechanism for burners comprising, in combination with the fuel passage leading to the burner, a valve controlling the flow of fuel through said passage, a manually operable device for controlling said valve, an operating device having a remote-control connection for controlling said valve, a releasable connection between said controlling devices, and an adjustable stop for limiting the valve-closing movement of said manually operable device.

7. Valve mechanism for burners comprising, in combination with the fuel passage leading to the burner, a valve controlling the flow of fuel through said passage, a thrust rod for actuating said valve, a manually operable device secured to said rod, a remote-control operating device rotatably mounted on said rod, and a releasable connection between said controlling devices.

8. Valve mechanism for burners comprising, in combination with the fuel passage leading to the burner, a valve controlling the flow of fuel through said passage, a thrust rod for actuating said valve, a manually operable device secured to said rod, a remote-control operating device rotatably mounted on said rod, a catch element associated with said remote-control device and adjustable about the axis of said rod, and a retractable pin carried by said manually operable device for engagement with said catch element.

9. Valve mechanism for burners comprising, in combination with the fuel passage leading to the burner, a valve controlling the flow of fuel through said passage, a thrust rod for actuating said valve, a dial, a manually operable device secured to said rod and adapted for movement around said dial, an operating device provided with a remote-control connection and rotatably mounted on said rod and provided with a catch element adjustable about the axis of said rod, a retractable pin carried by said manually operable device for engagement with said catch element, and a pointer carried by said catch element and movable around said dial for indicating the latching position of said element with relation to said manual device.

10. Valve mechanism for burners comprising, in combination with the fuel passage leading to the burner, a valve casing provided with a valve controlling the flow of fuel through said passage, an electric signal device provided with a controlling switch adapted to ground the circuit through said device through said casing, and an operating device having a remote-control connection for controlling said valve and provided with an operating connection including an insulating link.

11. Valve mechanism for burners comprising, in combination with the fuel passage leading to the burner, a valve controlling the flow of fuel through said passage, a valve-operating lever provided with a weight for actuating said lever in one direction, and a remote-control operating connection for actuating said lever in the opposite direction and provided with a weighted link in sliding engagement with one end of said lever.

In witness whereof I hereunto affix my signature.

ELI A. BASEL.